US010338870B2

(12) United States Patent
Hamakawa

(10) Patent No.: US 10,338,870 B2
(45) Date of Patent: Jul. 2, 2019

(54) ELECTRONIC DEVICE SUITABLE FOR WRITING INFORMATION TO WIRELESS TAG

(71) Applicant: KYOCERA Document Solutions Inc., Osaka (JP)

(72) Inventor: Takeshi Hamakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/125,766

(22) Filed: Sep. 10, 2018

(65) Prior Publication Data

US 2019/0018633 A1 Jan. 17, 2019

Related U.S. Application Data

(62) Division of application No. 15/631,681, filed on Jun. 23, 2017, now Pat. No. 10,120,631.

(30) Foreign Application Priority Data

Jul. 21, 2016 (JP) .................................. 2016-142963

(51) Int. Cl.
*G06F 3/12* (2006.01)
*H04B 5/00* (2006.01)
(Continued)

(52) U.S. Cl.
CPC .......... *G06F 3/1292* (2013.01); *G06F 3/1204* (2013.01); *G06F 3/1236* (2013.01);
(Continued)

(58) Field of Classification Search
CPC .... G06F 3/1292; G06F 3/1204; G06F 3/1296; G06F 3/1236; G06F 3/1237; G06F 3/1285; H04W 4/80; H04B 5/0031; H04L 67/34
(Continued)

(56) References Cited

U.S. PATENT DOCUMENTS 3,979,726 A * 9/1976 Lange ................. G06F 12/0864
711/135
2006/0169769 A1* 8/2006 Boyarsky ............... G06Q 20/18
235/381

(Continued)

FOREIGN PATENT DOCUMENTS

JP H04-307647 A 10/1992
JP H06-089371 A 3/1994
(Continued)

OTHER PUBLICATIONS

Office Action by Japan Patent Office, dated Oct. 23, 2018.

*Primary Examiner* — Allen H Nguyen
(74) *Attorney, Agent, or Firm* — Hawaii Patent Services; Nathaniel K. Fedde; Kenton N. Fedde

(57) ABSTRACT

Provided is an electronic device capable of effectively using a wireless tag. A second communication-control unit controls communication with a wireless tag. The second system-control unit reads management information that manages the data write area of the wireless tag via the second communication-control unit. There is empty area in the management information, the second system-control unit writes setup information that has status information indicating the setup state in the empty area.

2 Claims, 6 Drawing Sheets

(51) Int. Cl.
*H04W 4/80* (2018.01)
*H04L 29/08* (2006.01)

(52) U.S. Cl.
CPC ......... *G06F 3/1296* (2013.01); *H04B 5/0031* (2013.01); *H04L 67/34* (2013.01); *H04W 4/80* (2018.02); *G06F 3/1237* (2013.01); *G06F 3/1285* (2013.01)

(58) Field of Classification Search
USPC ....................................................... 358/1.15
See application file for complete search history.

(56) References Cited

U.S. PATENT DOCUMENTS

| | | | |
|---|---|---|---|
| 2006/0212165 A1* | 9/2006 | Watanabe | B65D 19/38 |
| | | | 700/217 |
| 2013/0235422 A1 | 9/2013 | Nakata | |
| 2015/0382136 A1* | 12/2015 | Mihira | H04W 12/06 |
| | | | 455/41.1 |

FOREIGN PATENT DOCUMENTS

| | | |
|---|---|---|
| JP | 2009-300544 A | 12/2009 |
| JP | 2013-186824 A | 9/2013 |

\* cited by examiner

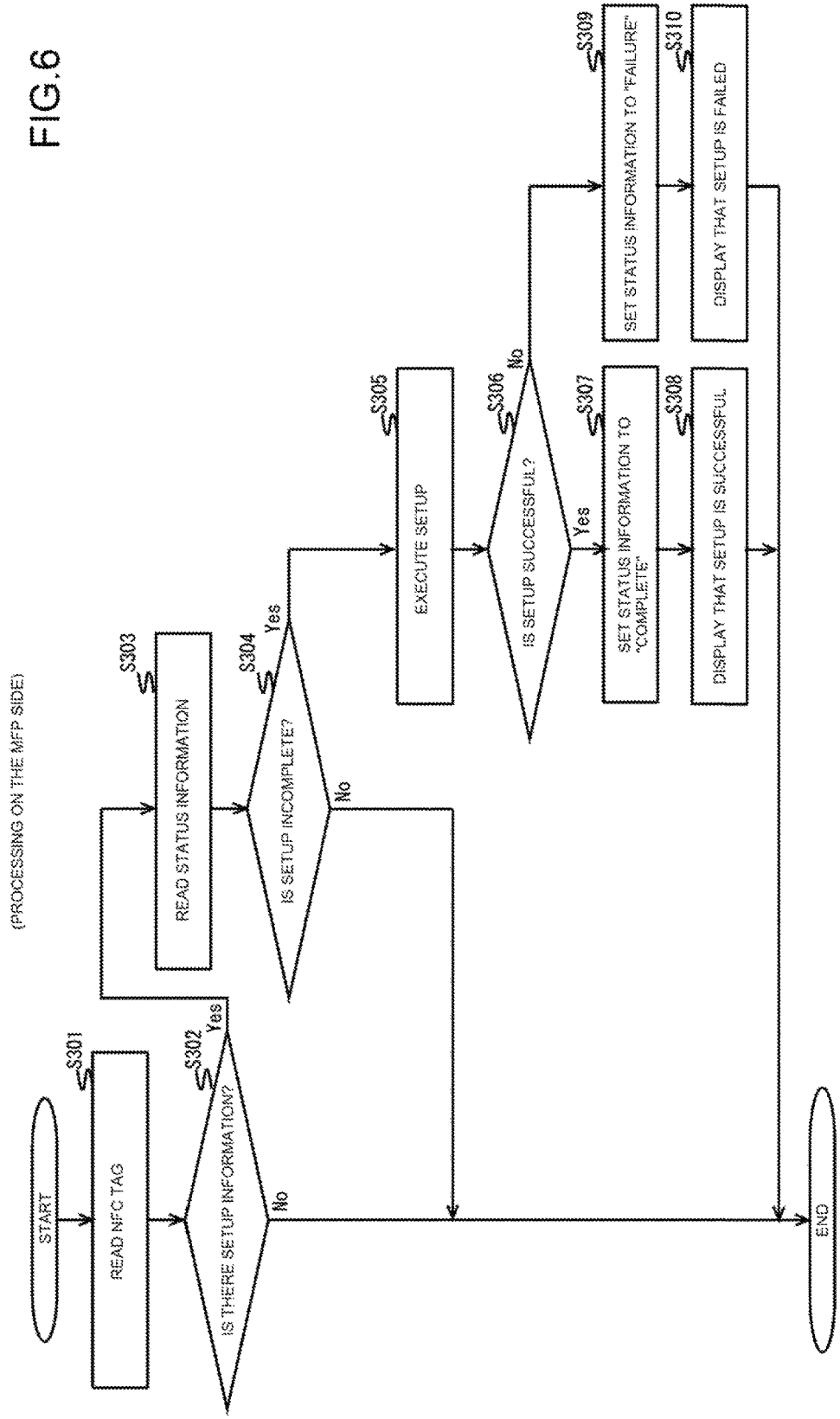

ELECTRONIC DEVICE SUITABLE FOR WRITING INFORMATION TO WIRELESS TAG

INCORPORATION BY REFERENCE

This application is based on and claims the benefit of priority from Japanese Patent Application No. 2016-142963 filed on Jul. 21, 2016, the contents of which are hereby incorporated by reference.

BACKGROUND

The present disclosure relates to an electronic device and recording medium that are suitable for writing information to a wireless tag such as a NFC (Near Field Communications) tag.

For example, in an image-forming apparatus that is a MFP (Multifunctional Peripheral) such as a printer, multifunction printer, combination machine and the like a wireless tag may be mounted. A wireless tag is a NFC tag or the like that stores wired or wireless connection information necessary for connecting to a network, machine information such as a machine name, and the like.

By managing a wireless tag by an image-forming apparatus, the connection information and the machine information of the wireless tag is rewritten by the image-forming apparatus. Particularly, when an update setting for a wireless tag on the image-forming apparatus side is automatically set, the image-forming apparatus automatically updates the connection information of the wireless tag as the connection information is updated. Moreover, it is possible for a wireless tag reader/writer function that is installed in a portable terminal to read the connection information and the machine information of the wireless tag or to write user-specific information to a wireless tag for activating various kinds of application programs that are installed, for example, in the portable terminal.

In typical technology, as a device that is equipped with this kind of wireless tag is a printer on which an IC (Integrated Circuit) tag is mounted that stores information related to an output destination or the like. A portable terminal having an IC card reader reads the information on the IC tag that is related to the output destination, and notifies a client PC (Personal Computer) about the information related to the output destination, printing settings and the like. There is a printing system that performs a printing process by having the client PC transmit spooled job information to a printer at the output destination.

SUMMARY

The electronic device according to the present disclosure includes a first communication-control unit and a first system-control unit. The first communication-control unit controls communication with a wireless tag that is capable of storing setup information that has status information indicating a setup state. The first system-control unit checks via the first communication-control unit whether or not the setup information is stored in the wireless tag, and when the setup information is stored, reads the setup information. The first system-control unit executes setup based on the setup information, and rewrites the status information to correspond to the setup state.

The electronic device according to the present disclosure includes a second communication-control unit and a second system-control unit. The second communication-control unit controls communication with a wireless tag. The second system-control unit, via the second communication-control unit, reads management information that manages the data write area of the wireless tag. When there is empty area in the management information, the second system-control unit writes setup information that has status information indicating the setup state in the empty area.

The non-transitory computer-readable recording medium according to the present disclosure stores an information update program that can be executed by a computer of an electronic device. When executed, the information update program causes the computer to control communication with a wireless tag that is capable of storing setup information that has status information indicating a setup state. The information update program checks whether or not the setup information is stored in the wireless tag, and when the setup information is stored, reads the setup information. The information update program performs control so as to execute setup based on the setup information, and rewrite the status information to correspond to the setup state.

BRIEF DESCRIPTION OF THE DRAWINGS

FIG. 6 illustrates steps of a reading process by which the MFP side in FIG. 1 reads information of an NFC tag.

DETAILED DESCRIPTION

In the following, an embodiment of an electronic device of the present disclosure will be explained with reference to FIG. 1 to FIG. 6. In the following explanation, as an example of an electronic device, there is an MFP (Multifunctional Peripheral) that is a complex peripheral device equipped, for example, with a printing function, a copying function, a FAX function, a data transmission/reception function via a network, and the like, or a portable terminal such as a smartphone and the like. As the portable terminal, it is also possible to use a tablet terminal, laptop computer and the like.

Figure 1:
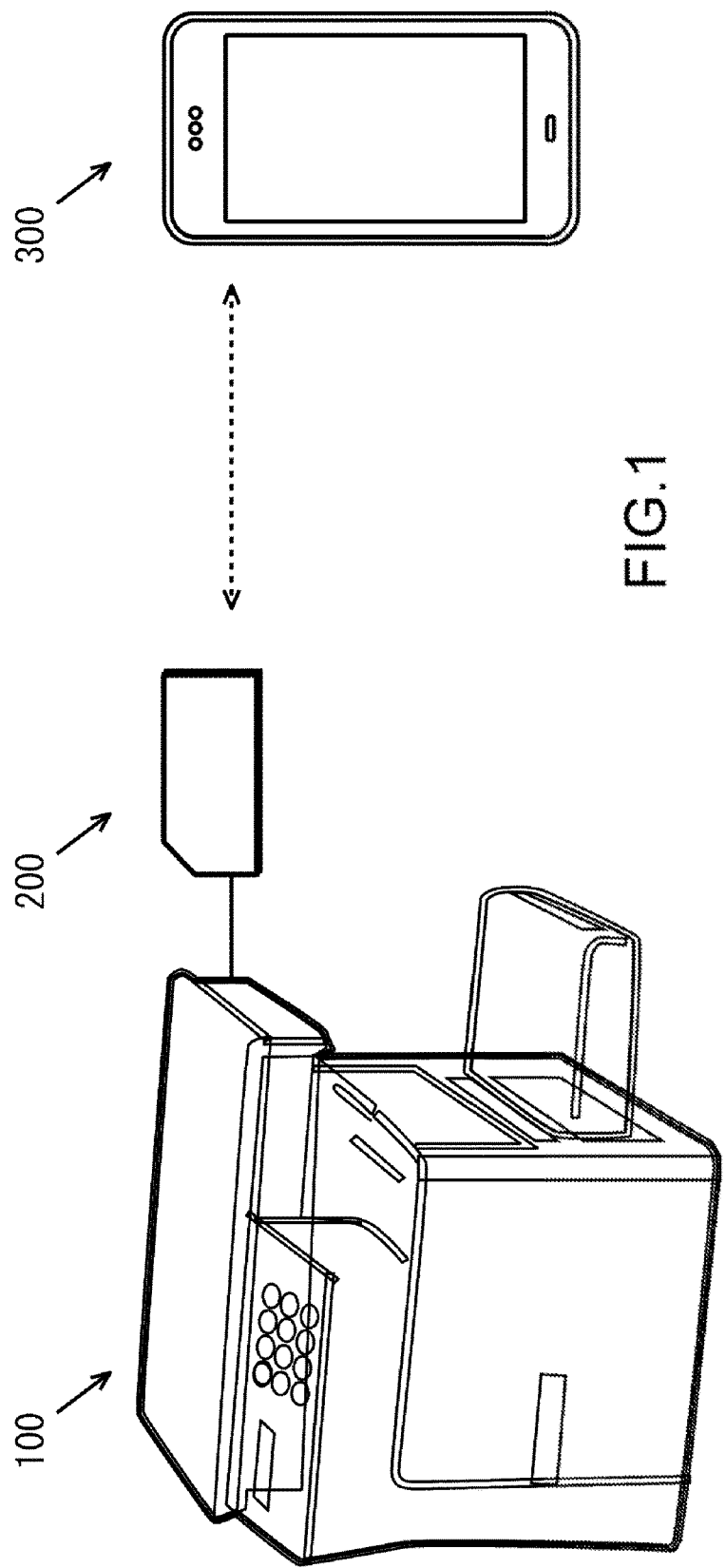
FIG. 1 illustrates an example of configuration when an electronic device of the present disclosure is applied to a MFP or portable terminal.

First, as illustrated in FIG. 1, an NFC (Near Field Communications) tag (hereafter, referred to as a wireless tag) 200 is connected to an MFP 100. The wireless tag 200 is connected to the MFP 100 by a wired connection (a serial bus such as a I2C bus and the like). Moreover, the wireless tag 200 is wirelessly connected to a portable terminal 300.

Although described in detail later, information that is stored in the wireless tag 200 can be rewritten by the MFP 100 and the portable terminal 300. Furthermore, user-specific information or setup information for activating various application programs that are installed in the portable terminal 300, for example, can be written in the wireless tag 200 by the portable terminal 300.

Figure 2:
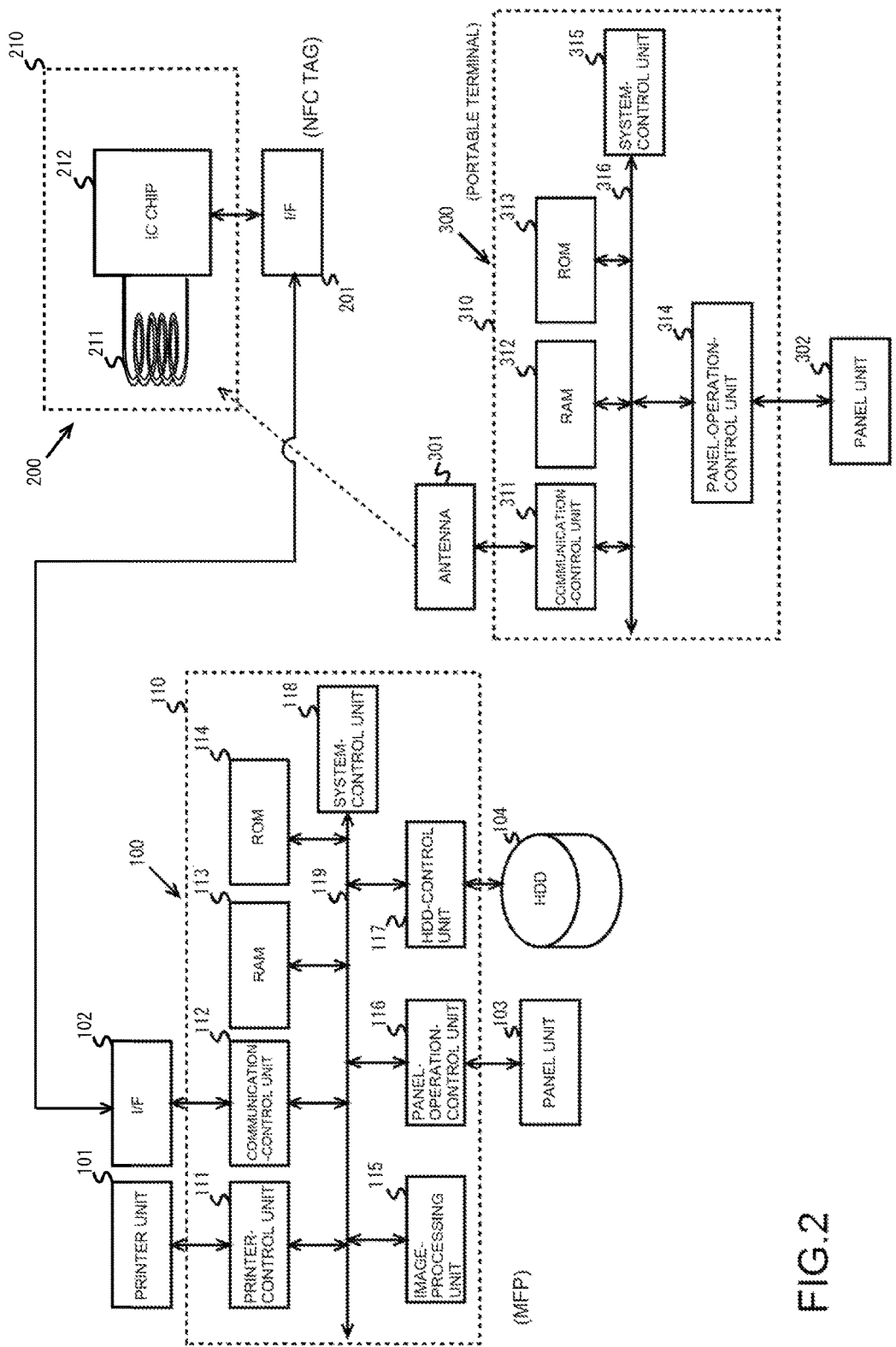
FIG. 2 illustrates an example of configuration of the MFP, NFC tag and portable terminal in FIG. 1

Next, referring to FIG. 2, an example of the configuration of the wireless tag 200 and the portable terminal 300 will be explained. First, the MFP 100 includes a control unit 110 that controls a printer unit 101, an I/F (interface) 102, a panel unit 103, and an HDD 104. The MFP 100 may also include a scanner unit, a FAX unit and the like.

The printer unit 101 is a device that prints images on paper based on printing data that is outputted from the control unit 110. The I/F 102 is in charge of communication with the wireless tag 200. The I/F 102 is in charge of communication with the portable terminal 300 via a network such as a LAN (Local Area Network). Moreover, the I/F 102 may also be in charge of communication with a content server, a webserver and the like. The panel unit 103 is a device such as a touch panel for performing a display for the printing function, the copying function, the FAX function, the data transmission/reception function via a network, and for various settings of the MFP 100. The HDD 104 is a storage device for storing application programs and the like for providing the various functions of the MFP 100. Furthermore, the HDD 104 has, for example, user boxes that store printing jobs that are registered from user terminals.

The control unit 110 is a processor that controls the overall operation of the MFP 100 by executing an image-forming program, control program and the like. The control unit 110 includes a printer-control unit 111, a communication-control unit 112, a RAM 113, a ROM 114, an image-processing unit 115, a panel-operation-control unit 116, an HDD-control unit 117 and a system-control unit 118. Moreover, these are connected to a database 119.

The printer-control unit 111 controls the printing operation of the printer unit 101. The communication-control unit 112 controls transmission/reception with the wireless tag 200 and the like via the I/F 102. The RAM 113 is a work memory for executing programs. A control program for checking the operation of each unit and the like is stored in the ROM 114. The image-processing unit 115 performs image processing (rasterization) on a printing job that is registered in a user box of the HDD 104, for example. The system-control unit 118 causes printing data that has undergone image processing by the image-processing unit 115 to be stored temporarily in the RAM 113.

The panel-operation-control unit 116 controls the display operation of the panel unit 103. Moreover, the panel-operation-control unit 116, via the panel unit 103, receives start settings and the like for printing, copying, FAX, data transmission/reception via a network and the like. The HDD-control unit 117 controls reading data from and writing data to the HDD 104.

The system-control unit 118 controls the cooperative operation of each unit. Although described in detail later, the system-control unit 118 reads, for example, setup information or the like that is written in the wireless tag 200, and executes setup and the like.

The wireless tag 200 includes a control unit 210 that controls the I/F 201. The I/F 201 is in charge of communication with the MFP 100. The control unit 210 has an antenna unit 211 and an IC chip 212. The antenna unit 211 performs communication with the portable terminal 300 using a specific frequency (for example, 13.56 MHz). The IC chip 212 has a non-volatile memory that stores NFC user data and the like that will be described later. Moreover, the IC chip 212 writes information received via the I/F 201 or antenna unit 211 to the non-volatile memory, and transmits information in the non-volatile memory via the I/F 201 or antenna unit 211. The information in the non-volatile memory is written in a format that is defined according to the NFC standard.

The portable terminal 300 includes a control unit 310 that controls an antenna 301 and a panel unit 302. The antenna 301 is in charge of communication with the wireless tag 200 and the like. The antenna 301 is in charge of communication with the MFP 100, a content server, a web server and the like via a network. The panel unit 302 is a device such as a touch panel for selecting the various functions of the portable terminal 300, inputting text, displaying information and the like.

The control unit 310 is a processor that controls the overall operation of the portable terminal 300 by executing application programs and control programs. The control unit 310 includes a communication-control unit 311, a RAM 312, a ROM 313, a panel-operation-control unit 314 and a system-control unit 315. Moreover, these units are connected to a data bus 316.

The communication-control unit 311 performs control of transmission and reception with the wireless tag 200, MFP 100 and the like via the antenna 301. The RAM 312 is a work memory for executing programs. A control program for checking the operation of each unit and the like is stored in the ROM 313. The panel-operation-control unit 314 controls the display operation and the like of the panel unit 302.

The system-control unit 315 controls the cooperative operation and the like of each unit. Moreover, the system-control unit 315 has a wireless tag reader/writer function, and when there is an instruction via the panel unit 302 to read or write the information of the wireless tag 200, the system-control unit 315 transmits a radio wave to the communication-control unit 311 from the antenna 301.

Next, the configuration of the wireless tag 200 will be explained with reference to FIG. 3. First, data is written to the wireless tag 200 in a format that is defined according to the NFC standard. The wireless tag 200 has, for example, NFC information (1) that has an area 221 where NFC user data is written and an empty area 222, and NFC information (2) that has a system area 223. The NFC information (1) and the NFC information (2) are management information for managing areas where data is written and the like. In other words, NFC information (1) has, for example, the size of area 201 where NFC user data is written, and the size of the empty area 222. Moreover, the NFC information (2) has, for example, the size of the system area 223. Device information of the MFP 100 is written in the area 221 where the NFC user data is written. The machine name, wired and wireless connection information for a network, and the like are written, for example, as device information.

Figure 3:
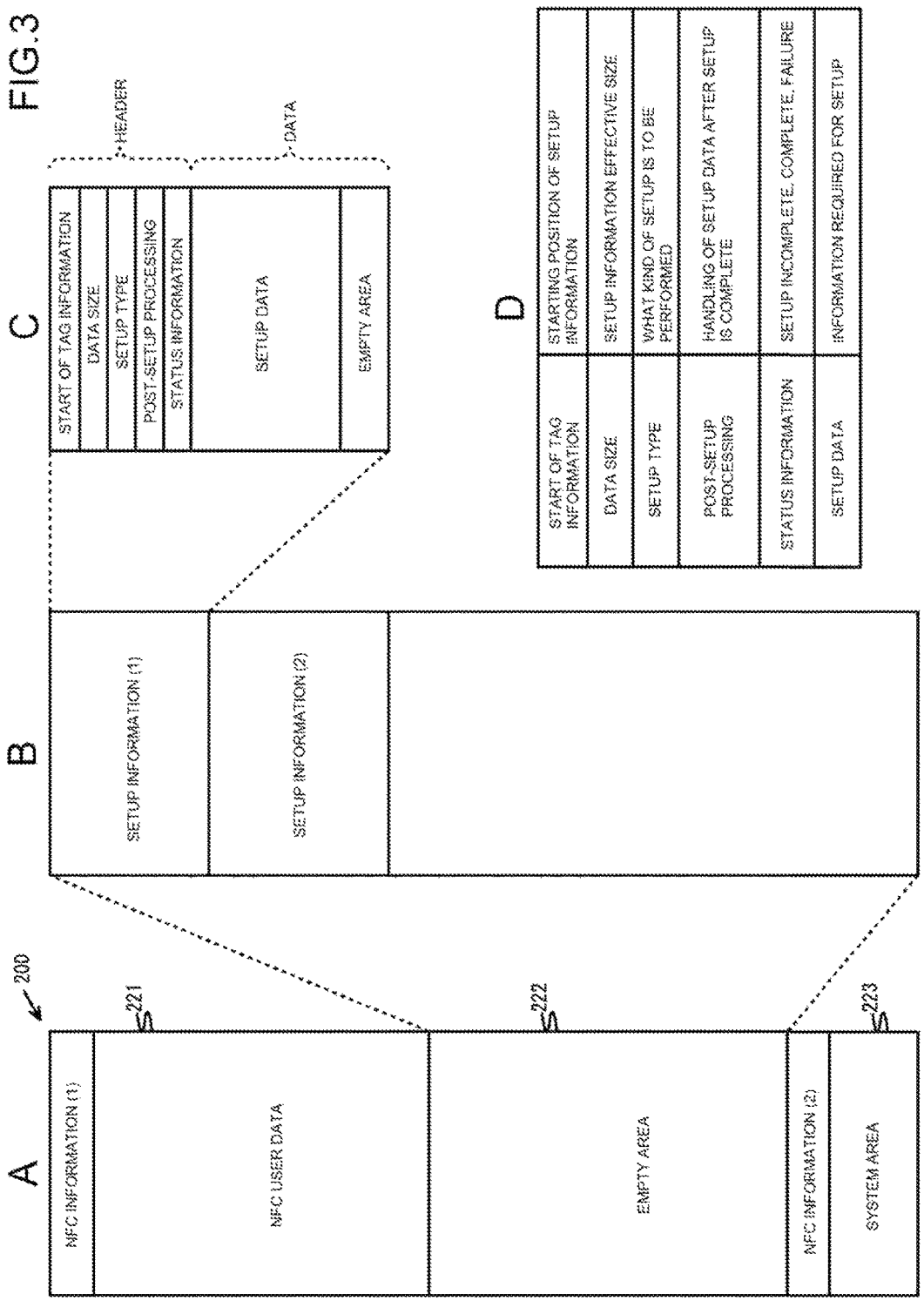
FIG. 3 illustrates Elements A-D. Element A illustrates configuration of a storage area of the NFC tag in FIG. 1, Element B illustrates information that is written to the empty area in Element A, Element C illustrates the information in Element B in detail, and Element D illustrates the header and data in Element C in detail.

As illustrated in Element B of FIG. 3, setup information (1), setup information (2) and the like can be written in the empty area 222 of the NFC information (1). The setup information (1) and setup information (2) each have different information contents related to setup. Elements A to D of FIG. 3 are enlarged views of the empty area 222, and illustrate the state of the setup information (1) and the setup information (2) being written in the empty area 222. In this state, the empty area is an area that excludes the area where the setup information (1) and setup information (2) are stored.

Here, as illustrated in Element C of FIG. 3 for example, the setup information (1) has, for example, a header and data. The header includes, for example, start of tag information, data size, setup type, post-setup processing, and status information. The data includes setup data.

Details of the header and data in Element C of FIG. 3 are as illustrated in Element D of FIG. 3 That is, the start of tag information indicates that starting position of the setup data. The data size indicates the effective size of the setup information. The setup type indicates what kind of setup is to be performed. Post-setup processing indicates how setup data will be handled after setup is complete (for example, deletion, storage in the HDD 104 or the like). The status information indicates whether setup is incomplete, complete or failed. The setup data indicates information required for setup. For example, the ID number and serial number of the mounted unit, adjustment information, connection information with an external server, and the like are written in the setup information (1). More specifically, the setup type, indicates, for example, performing settings of the mounted unit that corresponds to the ID number and serial number in the setup data to a default value based on adjustment information and the like, or performing connection settings based on connection information.

Figure 4:
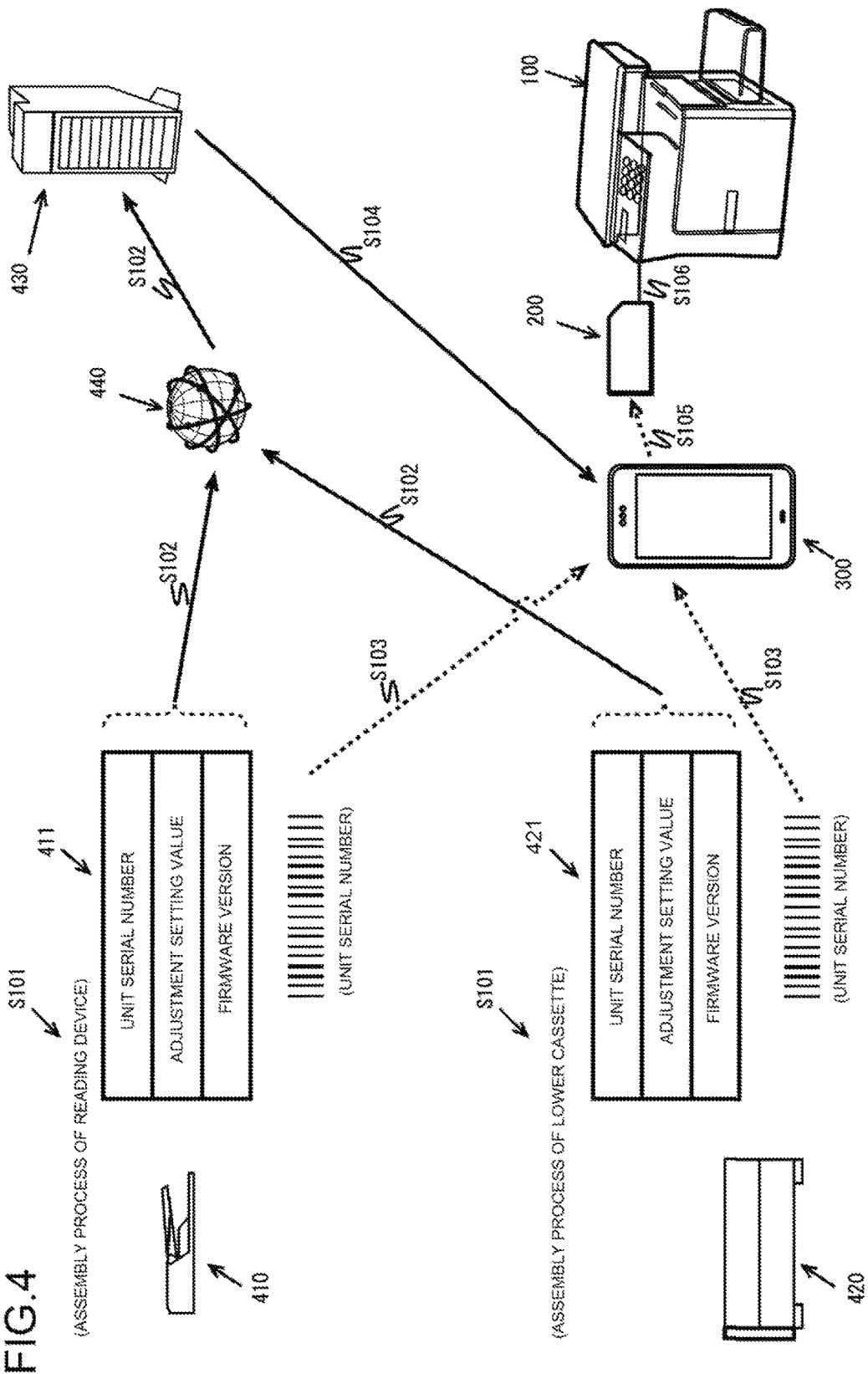
FIG. 4 illustrates an example of using the NFC tag in FIG. 1.

Next, an example of a method for using the wireless tag 200 will be explained with reference to FIG. 4. In FIG. 4, reference number 410 indicates a reading device, reference number 420 indicates a lower cassette, reference number 430 indicates a database server, and reference number 440 indicates a network such as the Internet. Moreover, the reading device 410 and the lower cassette 420 are prepared as options of the MFP 100. Options of the MFP 100 besides the reading device 410 and lower cassette 420, such as a finisher that is capable of sorting and stapling when printing plural copies may also be prepared, however, an explanation of other options will be omitted here.

(Step S101)

An external terminal constructs information 411 and 421 related to the assembly process of the reading device 410 and lower cassette 420.

A unit serial number, adjustment setting values, firmware version and the like of the reading unit 410, for example, are included in the information 411. Moreover, a unit serial number, adjustment setting values, firmware version and the like of the lower cassette 420, for example, are included in the information 421.

When constructing the information 411 and 421, barcodes 412 and 422 that indicate the respective unit serial numbers are prepared. These barcodes are adhered to the side surfaces of the reading device 410 and the lower cassette 420. Furthermore, these barcodes may be printed in or affixed to the instruction manuals of the reading device 410 and lower cassette 420.

(Step S102)

An external terminal, via a network 440, registers the information 411, 421 related to the assembly processes of reading device 410 and lower cassette 420 in the database server 430.

(Step S103)

The portable terminal 300 reads each of the barcodes 412, 422, and obtains the respective unit serial numbers.

(Step S104)

The portable terminal 300 accesses the database server 430 based on the obtained unit serial numbers, and obtains the information 411, 421 related to the assembly processes of the reading device 410 and lower cassette 420.

(Step S105)

The portable terminal 300 writes the obtained information 411, 421 related to the assembly processes of the reading device 410 and lower cassette 420 to the wireless tag 200.

In this case, the portable terminal 300 writes the information 411 related to the assembly process of the reading device 410 as the setup information (1) in Element B of FIG. 3, for example.

Moreover, the portable terminal 300 writes the information 421 related to the assembly process of the lower cassette 420 as the setup information (2) in Element B of FIG. 3, for example.

(Step S106)

The MFP 100 reads, for example, the setup information (1), (2) in Element B of FIG. 3, and executes setup.

The timing at which the MFP 100 reads the setup information (1), (2) may be when the power to the MFP 100 is turned ON, or may be when a read instruction from reading the setup information (1), (2) is given from the panel unit 103 or the portable terminal 300.

In step S105, the portable terminal 300 may write the respective unit serial numbers to the wireless tag 200, and in step S106, the MFP 100 may access the database server 430 and obtain the information 411, 412 related to the assembly processes of the reading device 410 and lower cassette 420.

Figure 5:
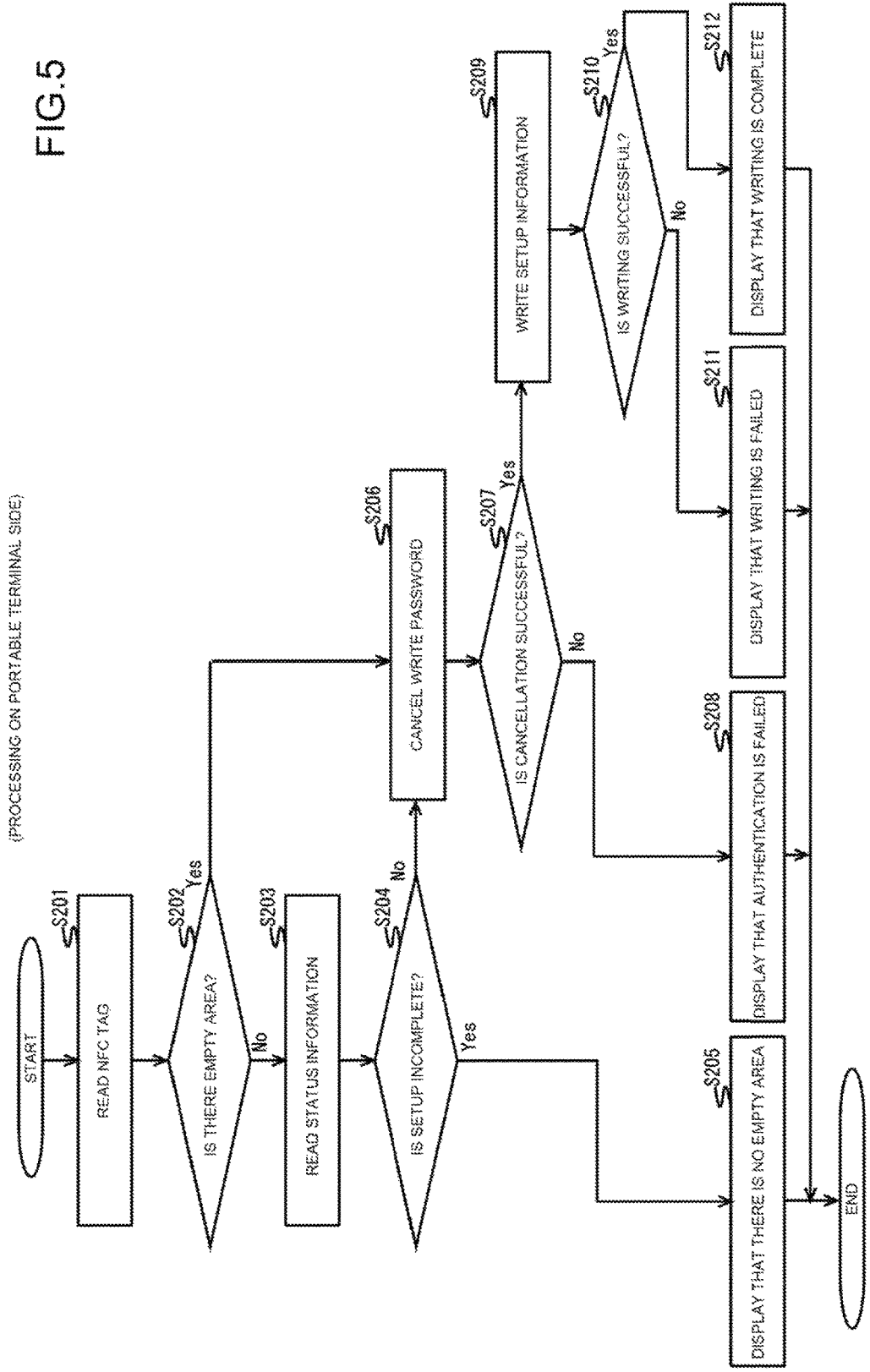
FIG. 5 illustrates steps of a writing process by which the portable terminal in FIG. 1 writes information to an NFC tag.

Next, processing on the portable terminal 300 side will be explained with reference to FIG. 5. In the following, the case of writing the information 411, 421 related to the assembly processes of the reading device 410 and lower cassette 420 illustrated in FIG. 4, for example, to the empty area 222 of the wireless tag 200 will be explained.

(Step S201)

The system-control unit 315 reads the wireless tag 200.

In this case, the system-control unit 315, via the communication-control unit 311, reads the wireless tag 200 by near field communication with the wireless tag 200.

(Step S202)

The system-control unit 315 determines whether or not there is an empty area 222 in the wireless tag 200.

In this case, the system-control unit 315, by using near field communication with the wireless tag 200, reads the size of the empty area 222 of the NFC information (1) illustrated in FIG. 3, for example, and when the system-control unit 315 determines that there is an empty area 222 (step S202: YES), proceeds to step S206.

However, when the system-control unit 315 determines that there is no empty area 222 (step S202: NO), the system-control unit proceeds to step S203.

(Step S203)

The system-control unit 315 reads the status information of the wireless tag 200.

In this case, the system-control unit 315 uses near field communication with the wireless tag 200 to read status information that is written in the header of the setup information (1) that is illustrated in FIG. 3 for example.

(Step S204)

The system-control unit 315 determines whether or not the status is "setup incomplete".

In this case, when the status information indicates that setup is complete or that setup is failed, the system-control unit 315 determines that the status is not "setup incomplete" (step S204: NO), and proceeds to step S206.

However, when the status information indicates that setup is incomplete, the system control unit 315 determines that the status is "setup incomplete" (step S204: YES), and proceeds to step S205.

(Step S205)

The system-control unit 315 displays that there is no empty area 222.

In this case, the system-control unit 315, via the panel-operation-control unit 314, causes the panel unit 302 to display that there is no empty area 222.
(Step S206)

The system-control unit 315 cancels the writing password.

In this case, the system-control unit 315 transmits a password that is inputted via the panel unit 302 to the wireless tag 200.
(Step S207)

The system-control unit 315 determines whether or not cancellation is successful.

In this case, the system-control unit 315, by using near field communication with the wireless tag 200, determines that cancellation is successful when the password is cancelled (step S207: YES), and proceeds to step S209.

However, the system-control unit 315 determines that cancellation is not successful when the password is not cancelled (step S207: NO), and proceeds to step S208.
(Step S208)

The system-control unit 315 displays that authentication is failed.

In this case, the system-control unit 315, via the panel-operation-control unit 314, causes the panel unit 302 to display that authentication is failed.
(Step S209)

The system-control unit 315 writes setup information.

In this case, the system-control unit 315, by using near field communication with the wireless tag 200, writes setup information (1) for example in the empty area 222 of the wireless tag 200. Moreover, when there is no empty space in the wireless tag 200, the system-control unit 315, by using near field communication with the wireless tag 200, may delete setup information that is already written in the wireless tag 200, and then write the setup information (1).

The contents of the setup information (1) may be, for example, the information 411, 421 related to the assembly processes of the reading device 410 and lower cassette 420 that were explained using FIG. 4. Moreover, the status information of the setup information (1) is "incomplete".

The information that is to be written in the empty area 222 of the wireless tag 200 is not particularly limited. For example, user-specific information or the like for activating various application programs that are stored in the portable terminal 300 may be written.
(Step S210)

The system-control unit 315 determines whether or not writing is successful.

In this case, when the system-control unit 315, by using near field communication with the wireless tag 200, determines that writing is successful (step S210: YES), the system-control unit 315 proceeds to step S212.

However, when the system-control unit 315 determines that writing is not successful (step S210: NO), the system-control unit 315 proceeds to step S211.
(Step S211)

The system-control unit 315 displays that writing is failed.

In this case, the system-control unit 315, via the panel-operation-control unit 314, causes the panel unit 302 to display that writing is failed.
(Step S212)

The system-control unit 315 displays that writing is complete.

In this case, the system-control unit 315, via the panel-operation-control unit 314, causes the panel unit 302 to display that writing is complete.

Next, processing on the MFP 100 side will be explained with reference to FIG. 6. The processing described below is executed, for example when the power to the MFP 100 is turned ON.
(Step S301)

The system-control unit 118 read the wireless tag 200.

In this case, the system-control unit 118, via the communication-control unit 112, reads the wireless tag 200 by communicating with the wireless tag 200 via a wired connection (serial bus such as a I2C bus).
(Step S302)

The system-control unit 118 determines whether or not there is setup information.

In this case, the system-control unit 118 checks, for example, whether or not setup information (1) is written in the empty area 222 illustrated in FIG. 3. When setup information (1) is written, the system-control unit 118 determines that there is setup information (step S302: YES), and proceeds to step S303.

However, when setup information (1) is not written, the system-control unit 118 determines that there is no setup information (step S302: NO), and ends processing.
(Step S303)

The system-control unit 118 reads the status information.

In this case, the system-control unit 118 reads, for example, the status information that is written in the header of the setup information (1).
(Step S304)

The system-control unit 118 determines whether or not the status is "setup incomplete".

In this case, when the status information that is written in the header of the setup information (1) indicates, for example, that setup is incomplete, the system-control unit 118 determines that the status is "setup incomplete" (step S304: YES), and proceeds to step S305.

However, when the status indicates that setup is complete or the setup is failed, the system-control unit 118 determines that the status is not "setup incomplete" (step S304: NO), and ends processing.
(Step S305)

The system-control unit 118 executes setup.

In this case, the system-control unit 118 executes setup, for example, based on the information 411, 421 that is related to the assembly processes of the reading device 410 and lower cassette 420 that is written by the portable terminal 300.
(Step S306)

The system-control unit 118 determines whether or not setup is successful.

In this case, when setting based on adjustment setting values and the like included in the information 411, 421, for example, are not complete, the system-control unit 118 determines that setup is not successful (step S306: NO), and proceeds to step S309.

However, when setting based on the adjustment setting values and the like included in the information 411, 421, for example is complete, the system-control unit 118 determines that setup is successful (step S306: YES), and proceeds to step S307.
(Step S307)

The system-control unit 118 sets the status information to "complete".

In this case, the system-control unit 118 writes "complete" in the status information of the header of the setup information (1) illustrated in FIG. 3, for example.

(Step S308)

The system-control unit 118 displays that setup is successful,

In this case, the system-control unit 118, via the panel-operation-control unit 116, causes the panel unit 103 to display that setup is successful.

(Step S309)

The system-control unit 118 sets the status information to "failure".

In this case, the system-control unit 118 writes "failure" in the status information of the header of the setup information (1) illustrated in FIG. 3, for example.

(Step S310)

The system-control unit 118 displays that setup is failed.

In this case, the system-control unit 118, via the panel-operation-control unit 116, causes the panel unit 103 to display that setup is failed.

In this way, in the present embodiment, when the electronic device is, for example, the MFP 100, the system-control unit 118 (first system-control unit), via the communication-control unit 112 (first communication-control unit), checks whether or not setup information is stored in the wireless tag 200. The communication-control unit 112 controls communication with the wireless tag 200 that is capable of storing setup information that has status information that indicates the setup state. When setup information is stored, the system-control unit 118 reads the setup information, executes setup based on that setup information, and writes status information that corresponds to the setup state.

Moreover, when the electronic device is, for example, the portable terminal 300, the system-control unit 315 (second system-control unit), via the communication-control unit 311 (second communication-control unit), reads NFC information (management information). The communication-control unit 311 controls communication with the wireless tag 200. The NFC information (management information) manages the data write area of the wireless tag 200. When there is an empty area 222 in the NFC information (management information), the system-control unit 315 writes setup information that has status information indicating the setup state in the empty area 222.

In this way, the portable terminal 300 writes setup information to the empty area 222 of the wireless tag 200, and the MFP 100 rewrites the status information of the setup information, so it is possible to effectively use the wireless tag 200.

Furthermore, the MFP 100 executes setup based on the setup information that is written in the wireless tag 200, so it is possible to omit the adjustment setting or the network connection setting via the panel unit 103.

The portable terminal 300 can also write arbitrary information other than setup information in the empty area 222 of the wireless tag 200.

In a typical printing system described above, by notifying a client PC that is spooling job information of information related to the output destination and printing settings that are read from an IC tag that is attached to a printer by a portable terminal, the printing process is executed by the printer, so giving printing instructions to the printer becomes easy.

Incidentally, NFC (Near Field Communication) information is written in a format that is defined by NFC Forum in a data storage area of an NFC tag that is one standard of an IC tag that is attached to a printer, for example. Moreover, it is possible to read NFC information from a terminal that supports NFC. However, when the amount of data of NFC information is less than the storage area that is prepared as the NFC tag, a lot of empty area will be present and there is a problem in that effective use may not be possible.

With the electronic device and recording medium of the present disclosure, it is possible to write setup information in the empty area of a wireless tag, and rewrite status information of the setup information, so it is possible to effectively use the wireless tag.

In the present embodiment, the case of applying the electronic device of the present disclosure to an MFP 100 was explained, however, the electronic device could also be applied to an information device such as a PC (Personal Computer), household appliance and the like.

What is claimed is:

1. An electronic device comprising:
    a communication-control unit that controls communication with a wireless tag, wherein the wireless tag is provided in the electronic device and allows setup information that has status information indicating the setup state of the electronic device to be written to the wireless tag; and
    a system-control unit that via the communication-control unit reads management information that manages the data write area of the wireless tag; wherein
    when there is empty area in the management information, the system-control unit writes the setup information, and wherein
    when there is no empty area in the management information, the system-control unit,
    reads the status information;
    deletes the setup information when the status information read is setup complete or setup failed; and
    writes new setup information that has status information of the new setup information as incomplete.

2. A system comprising the electronic device according to claim 1 and a portable terminal,
    the portable terminal being configured to write the setup information to the wireless tag.

* * * * *